（12）United States Patent
Smirnov et al.

(10) Patent No.: US 8,836,194 B2
(45) Date of Patent: Sep. 16, 2014

(54) MOTOR COMPRISING ASYMMETRIC UNEVEN PRELOAD INDENTATIONS

(75) Inventors: Viatcheslav Smirnov, Suwon-si (KR); Ho-Jun Yoo, Suwon-si (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 327 days.

(21) Appl. No.: 12/706,616

(22) Filed: Feb. 16, 2010

(65) Prior Publication Data

US 2011/0006629 A1 Jan. 13, 2011

(30) Foreign Application Priority Data

Jul. 10, 2009 (KR) .................. 10-2009-0063123

(51) Int. Cl.
| | |
|---|---|
| *H02K 21/22* | (2006.01) |
| *F16C 25/04* | (2006.01) |
| *H02K 7/09* | (2006.01) |
| *H02K 7/08* | (2006.01) |
| *H02K 5/167* | (2006.01) |
| *G11B 19/20* | (2006.01) |
| *F16C 17/10* | (2006.01) |

(52) U.S. Cl.
CPC .............. *H02K 7/09* (2013.01); *F16C 25/045* (2013.01); *H02K 7/085* (2013.01); *H02K 5/1675* (2013.01); *G11B 19/2009* (2013.01); *F16C 17/10* (2013.01); *F16C 2370/12* (2013.01)
USPC ... 310/156.04; 310/51; 310/81; 310/216.058; 310/216.096; 310/216.107

(58) Field of Classification Search
CPC ......... H02K 1/146; H02K 1/14; H02K 21/22; H02K 21/12
USPC .......... 310/51, 81, 156.04, 216.058, 216.098, 310/49.24, 216.096
IPC ..................... H02K 21/12, 21/22, 1/146, 1/14
See application file for complete search history.

(56) References Cited

U.S. PATENT DOCUMENTS

| | | | | | |
|---|---|---|---|---|---|
| 4,547,714 | A | * | 10/1985 | Muller | .................. 318/400.41 |
| 4,554,491 | A | * | 11/1985 | Plunkett | .................. 318/400.41 |
| 5,013,957 | A | * | 5/1991 | Wrobel | .................. 310/216.049 |

(Continued)

FOREIGN PATENT DOCUMENTS

| | | |
|---|---|---|
| JP | 2009-521202 | 5/2009 |
| KR | 10-2009-0058163 | 6/2009 |

OTHER PUBLICATIONS

Korean Office Action, w/ partial English translation thereof, issued in Korean Patent Application No. KR 10-2009-0063123 dated Dec. 7, 2010.

*Primary Examiner* — John K Kim
(74) *Attorney, Agent, or Firm* — McDermott Will & Emery LLP

(57) ABSTRACT

A motor including a rotor and a stator that supports and rotates the rotor is disclosed. In accordance with an embodiment of the present invention, the motor includes a magnetic member, which is installed in the rotor such that the magnetic member faces the stator, and a stator magnetic body, which is a part of the stator and has a part corresponding to the magnetic member formed asymmetrically therein. In this way, the motor can prevent a whirling effect by installing the magnetic member, which forms a preload, even the motor is thinner.

1 Claim, 6 Drawing Sheets

(56) References Cited

U.S. PATENT DOCUMENTS

| | | | |
|---|---|---|---|
| 5,170,086 A * | 12/1992 | Wrobel et al. | 310/216.049 |
| 5,465,019 A * | 11/1995 | Kliman | 310/156.04 |
| 5,689,147 A * | 11/1997 | Kaneda et al. | 310/216.004 |
| 5,967,763 A * | 10/1999 | Horng | 417/423.7 |
| 6,531,796 B1 * | 3/2003 | Konno | 310/67 R |
| 6,728,063 B1 * | 4/2004 | Gustafson et al. | 360/99.08 |
| 6,982,505 B2 * | 1/2006 | Horng et al. | 310/51 |
| 7,417,345 B2 * | 8/2008 | Chen et al. | 310/90.5 |
| 7,420,310 B2 * | 9/2008 | Kadowaki et al. | 310/216.016 |
| 2003/0146671 A1 * | 8/2003 | Diehl et al. | 310/254 |
| 2004/0104631 A1 * | 6/2004 | Noguchi | 310/81 |
| 2007/0138904 A1 * | 6/2007 | Chae | 310/268 |
| 2007/0241643 A1 * | 10/2007 | Watanabe et al. | 310/67 R |
| 2011/0006629 A1 * | 1/2011 | Smirnov et al. | 310/156.04 |

* cited by examiner

MOTOR COMPRISING ASYMMETRIC UNEVEN PRELOAD INDENTATIONS

CROSS-REFERENCE TO RELATED APPLICATIONS

This application claims the benefit of Korean Patent Application No. 10-2009-0063123, filed with the Korean Intellectual Property Office on Jul. 10, 2009, the disclosure of which is incorporated herein by reference in its entirety.

BACKGROUND

1. Technical Field

The present invention relates to a motor.

2. Description of the Related Art

Spindle motors are commonly used in electronic products, for example, computer drives, which require accurately-rotating devices. Such spindle motors are extremely promising because the spindle motors can be rotated at a high speed with less power and can be readily controlled with high precision.

A typical spindle motor is constituted by a rotating rotor and a stator, which supports the rotating movement of the rotor.

However, a whirling effect may occur when the rotor rotates because of a gap formed between the rotational axis of the rotor and the through-hole of the stator supporting the rotor.

A useful method known to prevent such whirling effect from occurring is forming an asymmetric gravitational force, i.e., an asymmetric preload, between the rotor and the stator. As such, a method of forming an asymmetric magnetic force by disposing an asymmetric magnetic member on the rotational axis of the stator has been proposed. With the spindle motors becoming thinner, however, the drawback to such method is that it is difficult to form a space for installing the magnetic member inside the stator.

Even though a method of disposing a magnetic member asymmetrically on the rotor has been also proposed to form an asymmetric preload, the magnetic member asymmetrically disposed on the rotor has caused an uneven distribution of load, resulting in undesired vibration when the rotor rotates.

SUMMARY

The present invention provides a motor that can form an asymmetric preload even in a thinner structure.

The present invention also provides a motor that can form a preload while evenly distributing the load of a rotor.

An aspect of the present invention provides a motor including a rotor and a stator that supports and rotates the rotor. In accordance with an embodiment of the present invention, the motor includes a magnetic member, which is installed in the rotor such that the magnetic member faces the stator, and a stator magnetic body, which is a part of the stator and has a part corresponding to the magnetic member formed asymmetrically therein.

The magnetic member can be formed symmetrically about a rotational axis of the rotor.

The magnetic member can be formed in the shape of a donut having a same center as the rotational axis of the rotor.

The stator can include a stator core that is disposed opposite to face the magnetic member.

The stator core can be formed asymmetrically about the rotational axis of the rotor.

The stator can further include a housing, which supports and rotates the rotational axis of the rotor, and the stator core can include a housing hole and a preload indentation, in which the housing hole has the housing inserted therein and the preload indentation is formed asymmetrically in the housing hole.

Additional aspects and advantages of the present invention will be set forth in part in the description which follows, and in part will be obvious from the description, or may be learned by practice of the invention.

DETAILED DESCRIPTION

A motor according to a certain embodiment of the present invention will be described below in more detail with reference to the accompanying drawings.

Figure 1:
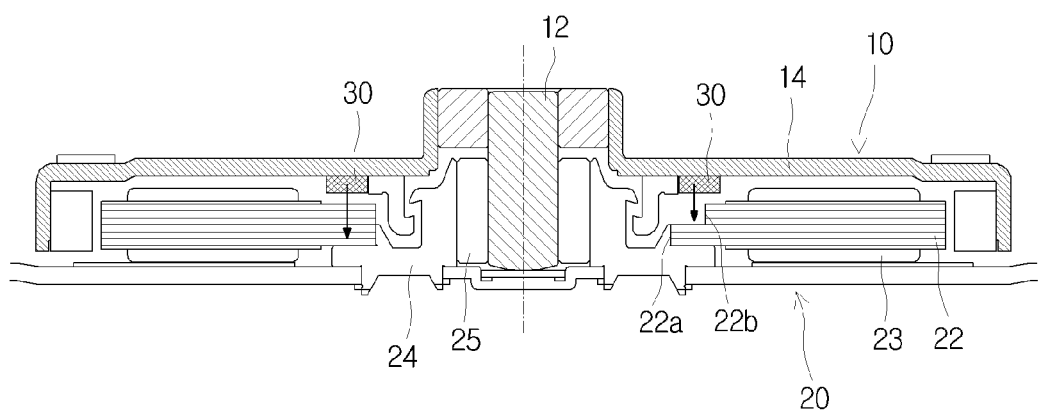
FIGS. 1 and 2 are cross-sectional views illustrating a motor in accordance with an embodiment of the present invention.
Figure 2:
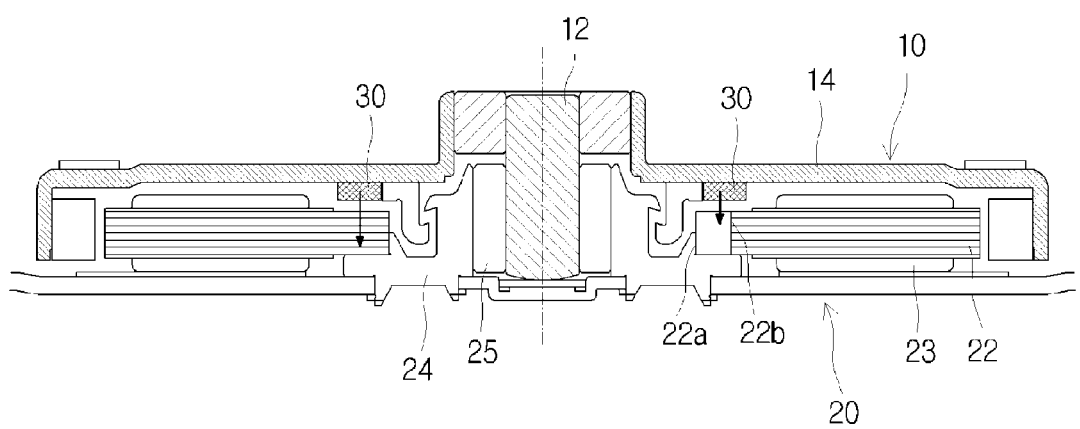
Figure 3:
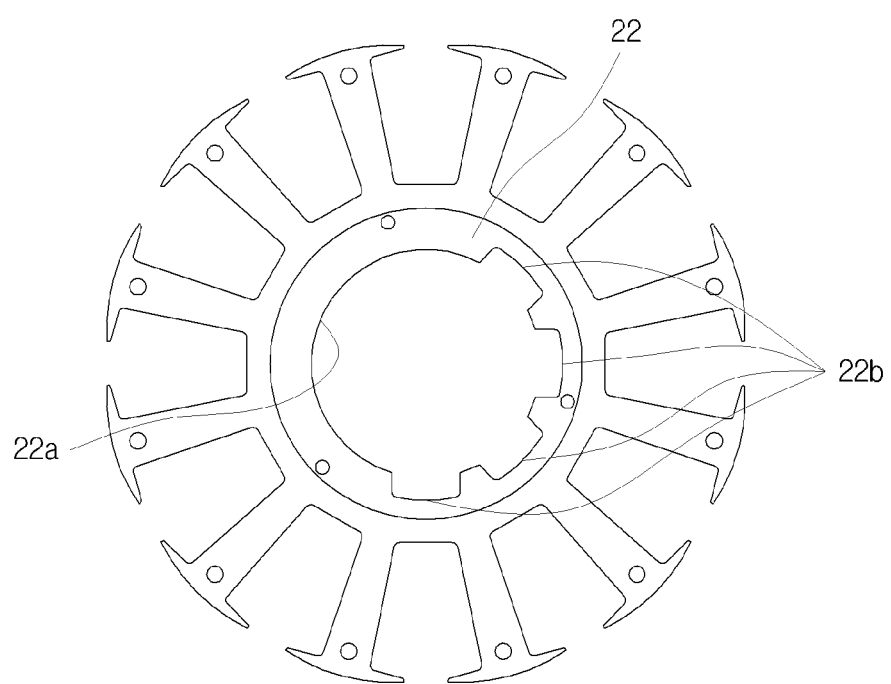
FIG. 3 is a plan view illustrating a stator core of a motor in accordance with an embodiment of the present invention.
Figure 4:
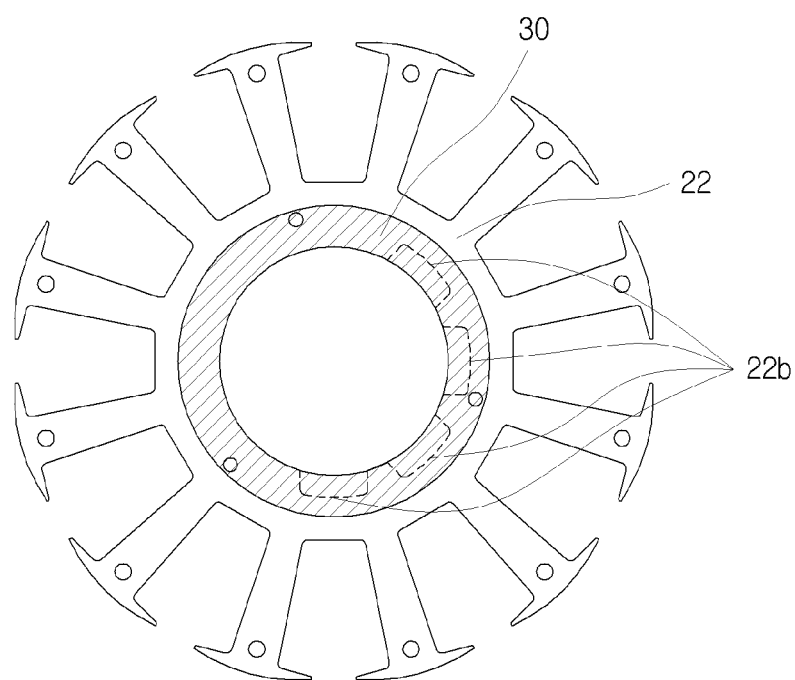
FIG. 4 is a plan view illustrating a stator core and a magnetic member of a motor in accordance with an embodiment of the present invention.
Figure 5:
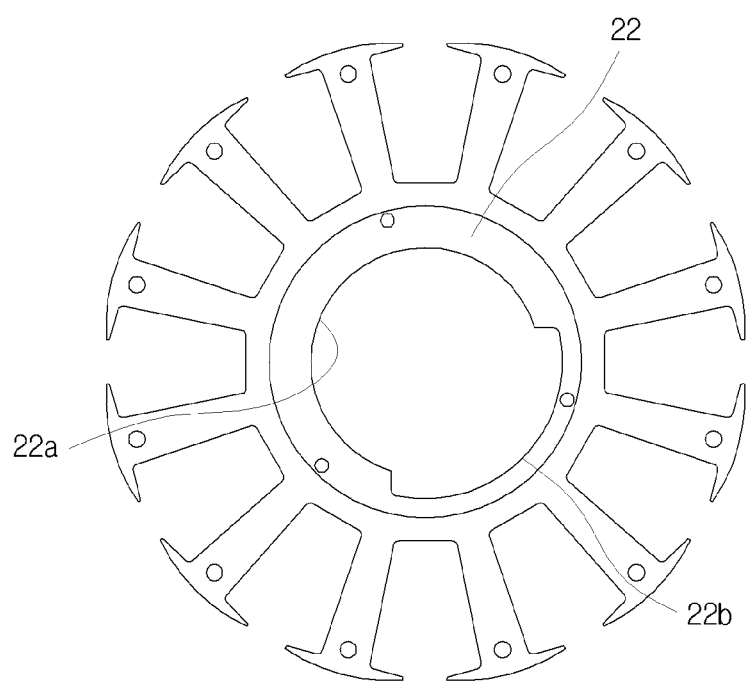
FIGS. 5 and 6 are plan views illustrating different types of a stator core of a motor in accordance with an embodiment of the present invention.
Figure 6:
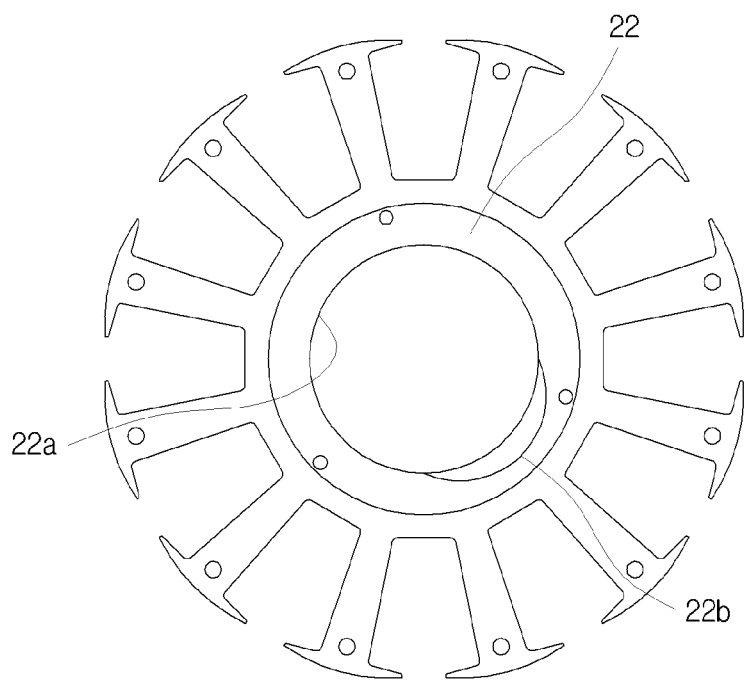

FIGS. 1 and 2 are cross-sectional views of a motor according to an embodiment of the present invention, and FIG. 3 is a plan view of a stator core in a motor according to an embodiment of the present invention. FIG. 4 is a plan view illustrating a stator core and a magnetic member in a motor according to an embodiment of the present invention.

A motor according to an embodiment of the present invention includes a stator 20, a rotor 10 and a magnetic member 30.

A common motor is generally constituted by a rotor and a stator, which supports the rotational movement of the rotor. For example, the rotor may include a shaft and a rotor case, and the stator may include a housing that supports and rotates the shaft.

However, it shall be noted that the rotor and the stator are functionally defined, not by their physical constitution. That is, it is also possible in a different configuration that the shaft is fixed and the housing surrounding the fixed shaft rotates. In this case, the shaft becomes the stator, and the housing becomes the rotor.

In the motor according to an embodiment of the present invention, as illustrated in FIG. 1, the stator 20 includes a housing 24 and a stator core, and the rotor 10 includes a rotational axis 12 and a rotor case 14.

The motor of the present embodiment features an uneven preload formed between the rotor 10 and the stator 20 because a magnetic member 30 facing the stator 20 is installed in the rotor 10 and a part of a stator magnetic body 22 that is opposite to the magnetic member 30 is formed asymmetrically. Here, the stator magnetic body 22 is a part of the stator 20 where a magnetic force is applied.

More specifically, the magnetic member 30 is a part that forms an attractive force by the magnetic force between the rotor 10 and the stator 20, and can be installed on one surface of the rotor 10 to face the stator magnetic body 22. As the motor becomes thinner, it is increasingly difficult to form a space to accommodate the magnetic member 30 inside the stator 20. For this reason, the magnetic member 30 may be installed on a surface of the rotor case 14, where no device is installed, to address the thinner motor.

To prevent vibrations from occurring when the rotor 10 rotates, the magnetic member 30 can be formed symmetrically about the rotational axis 12 of the rotor 10. The magnetic member 30 of the present embodiment can be formed in the shape of a donut having the same center as the rotational axis 12 of the rotor 10 to distribute the load of the rotor 10 evenly.

In addition, since the magnetic member 30 is placed to face the stator magnetic body 22, which is a part of the stator 20 that has magnetism, it is unnecessary to have an additional magnetic body corresponding to the magnetic member 30 in the motor, thus making the motor thinner and reducing the production cost.

In the motor of this embodiment, a stator core is used as the stator magnetic body 22. The stator core is a segment on which the coil 23 of an electromagnet is wound, and can be made of a magnetic body such as steel. As illustrated in FIGS. 3 and 4, the stator core and the magnetic member 30 are placed opposite to face each other, and the part of the stator core corresponding to the magnetic member 30 is formed asymmetrically.

Since the magnetic member 30 is formed symmetrically about the rotational axis 12 of the rotor 10, the stator core can form an uneven preload by being formed asymmetrically about the rotational axis 12 of the rotor 10.

In this embodiment, particularly, preload indentations 22b are formed asymmetrically in the stator core about the rotational axis 12 of the rotor 10 such that the stator core facing the magnetic member 30 can be formed asymmetrically. Specifically, the stator core of this embodiment is coupled to the housing 24, which supports and rotates the rotational axis of the rotor, so that a housing hole 22a, into which the housing 24 is inserted, can be formed in the stator core, and the preload indentations 22b can be formed asymmetrically in the inner circumference of the housing hole 22a. Thus, without having an additional magnetic member corresponding to the magnetic member 30, an asymmetric force, i.e., an asymmetric preload, can be formed between the rotor 10 and the stator 20.

As illustrated in FIGS. 1 and 2, the asymmetric ratio of preload can be adjusted by changing the number of stacked stator cores having preload indentations 22b formed therein. Specifically, the preload indentations 22b can be formed in some of a plurality of stacked stator cores (refer to FIG. 1), or can be formed in all of the plurality of stacked stator cores (refer to FIG. 2).

Furthermore, as illustrated in FIGS. 3 to 6, the preload indentation 22b can be one or a plurality, or can be implemented in a variety of forms, depending on the design conditions.

While the spirit of the present invention has been described in detail with reference to a particular embodiment, the embodiment is for illustrative purposes only and shall not limit the present invention. It is to be appreciated that those skilled in the art can change or modify the embodiment without departing from the scope and spirit of the present invention.

As such, many embodiments other than that set forth above can be found in the appended claims.

What is claimed is:

1. A motor comprising:
   a rotor, the rotor including a shaft and a rotor case coupled to the shaft; and
   a stator that supports and rotates the rotor;
   a magnetic member installed in the rotor case such that the magnetic member faces the stator; and
   a stator magnetic body being a part of the stator where a magnetic force is applied, wherein:
   the stator magnetic body that is opposite to the magnetic member is formed asymmetrically about the rotational axis of the rotor such that an uneven preload is formed between the rotor and the stator,
   the stator further comprises a housing configured to support and rotate the rotational axis of the rotor,
   the stator magnetic body comprises a housing hole and preload indentations, the stator magnetic body wherein a portion of the housing is inserted, the preload indentations being disposed asymmetrically within the housing hole of the stator magnetic body,
   the magnetic member is formed symmetrically about a rotational axis of the rotor,
   the magnetic member is installed on one surface of the rotor case,
   the magnetic member is formed in the shape of a ring having a same center as the rotational axis of the rotor, and
   the stator magnetic body is a stator core.

* * * * *